Patented Feb. 13, 1940

2,189,771

UNITED STATES PATENT OFFICE 2,189,771

PROCESS FOR PRODUCING STYRENE

Omar H. Smith, West Englewood, N. J., assignor, by mesne assignments, to Carbide and Carbon Chemicals Corporation, New York, N. Y., a corporation of New York No Drawing. Application May 22, 1937, Serial No. 144,310

5 Claims. (Cl. 260—669)

This invention relates to improvements in the making of styrenes.

An object of the invention is to provide a method of making styrenes from the corresponding alkyl-substituted benzols whereby lower operating temperatures may be used in the cracking operation, as well as giving higher concentrations of the styrene than have heretofore been possible. Other objects will be apparent from the following description.

According to the invention the alkyl-substituted benzol, for example ethyl benzol, is reacted in a cracking tube or its equivalent with a substantial proportion of a halogen-producing compound and an organic base capable of forming a hydrohalide. Any compound producing halogen at the cracking temperature employed may be used, preferably poly-chloro aliphatic hydrocarbons of low carbon content, such as carbon tetrachloride, tetra-chlor-ethane, and ethylene chloride, ethylene bromide, and others, as set forth in U. S. P. 1,938,827. Any organic base may be used which will combine with the halogen acid, including, preferably, pyridine, diethylamine, dibenzylamine, and others. It is considered that the process involves concurrent halogenation and dehydro-halogenation of the alkyl benzol by the added reagents, accounting for at least one-half of the styrene produced, in addition to direct thermal dehydrogenation of alkyl benzol, accounting for the remainder of the styrene produced, whereby hydrogen is removed from the alkyl benzol to form the styrene.

Preferably the halogen-producing compound is used in such proportion as to provide at least about 15% (by weight) of halogen, referred to the total alkyl benzol passed into the tube. By the use of such proportion of the halogenating agent, together with an organic base to bind the hydrogen halide formed, it is found that the yield of styrene is at least doubled. It is further found that the increase in the amount of styrene produced when 15% of halogen is thus provided, is approximately equivalent to that amount of the halogenating agent. With higher amounts of halogenating agents, it is found that the effectiveness of the added increments falls off somewhat. Whereas the reaction temperatures may be varied widely according to the type of halogen- or chlorine-producing compound and organic base that is used, satisfactory results may be obtained at temperatures as low as 550° C. The relatively low cracking temperatures permit of reducing the cracking of the finally formed styrene, so that its final concentration is generally limited by the amounts of the chlorine or other halogen-producing compound and the organic base that is added. Generally it is preferred to maintain as high a temperature as is compatible with the least loss of the alkyl-benzol by formation of benzol, carbon and hydrocarbon gases. In this manner the styrene is produced by cracking as well as by the action of the added reagents. Whereas mean temperatures between 650° C. and 680° C. have been found most efficient as indicated below, the optimum temperature will vary with variations in rate of flow, relation between the length and diameter of the cracking tube, and location of the heat recording device, as will be apparent to those skilled in the art.

The proportion of organic base to be employed is such as to combine with at least the greater part of the hydrogen halide formed in the cracking tube. While the amount of base may be equivalent to all of the hydrogen halide formed, it is permissible to use somewhat less than the full equivalent of base, in order to avoid clogging of the apparatus with the solid salt, without impairing the efficiency of the process.

In the runs summarized below, illustrating the invention, an electrically heated iron tube, 3 feet long and ¾ inch inside diameter is employed. The mixture to be cracked is continuously fed in at the rate of 100 grams per hour. The cracked reaction product is subsequently steam distilled as is known, recovering an ethyl benzol-styrene mix, and the test evaluated by analyzing the steam distillate. The term "productivity" is used to designate the ratio between the ethyl benzol passed through the cracking tube and the styrene which is produced. The term "efficiency" is used to designate the ratio between the styrene produced and the ethyl benzol which is consumed during the cracking operation.

| Run number | Mixture | Mean temperature, °C. | Steam distillate Styrol conc., percent | Steam distillate Specific gravity at 25° C. | Productivity | Efficiency |
|---|---|---|---|---|---|---|
| 1 | 100 ethyl benzol | 675 | 24.0 | | 18.2 | 27.0 |
| 2 | 100 ethyl benzol, 10 carbon tetrachloride | 700 | 41.0 | | 28.8 | 35.4 |
| 3 | 100 ethyl benzol, 30 carbon tetrachloride | 672 | 44.8 | .887 | 27.7 | 43.4 |
| 4 | 100 ethyl benzol, 30 carbon tetrachloride, 64 pyridine | 675 | 48.0 | .894 | 40.0 | 70.8 |
| 5 | 100 ethyl benzol, 50 carbon tetrachloride | 660 | 48.6 | .905 | 29.6 | 43.0 |
| 6 | 100 ethyl benzol, 50 carbon tetrachloride, 75 pyridine | 660 | 57.0 | .896 | 43.3 | 64.3 |
| 7 | 100 ethyl benzol, 15 carbon tetrachloride, 20 pyridine | 686 | 46.3 | .882 | 36.1 | 62.1 |
| 8 | 70 ethyl benzol, 30 benzol, 18 carbon tetrachloride, 25 pyridine | 672 | 33.9 | .882 | 40.5 | 71.2 |
| 9 | 50 ethyl benzol, 50 benzol, 30 carbon tetrachloride, 40 pyridine | 670 | 30.2 | .881 | 50.4 | 75.2 |
| 10 | 100 ethyl benzol, 20 carbon tetrachloride, 26 diethylamine | 670 | 42.6 | .880 | 36.2 | 71.0 |
| 11 | 100 ethyl benzol, 20 ethylene chloride, 30 pyridine | 680 | 44.8 | .897 | 37.6 | 68.2 |

Run 1 illustrates the low styrene concentration, the low productivity and the low efficiency obtained by cracking of pure ethyl benzol in the absence of any additions. Run 2 illustrates the relatively low efficiency of added carbon tetrachloride when singularly used with ethyl benzol. Runs 3 and 5 illustrate the relative inefficiency of carbon tetrachloride in larger proportions in the absence of the organic base. Comparison of tests 2, 3 and 5 shows that merely increasing the proportion of carbon tetrachloride effects only a slight increase in efficiency and substantially no change in the productivity. Run 4, and runs 6–11, inclusive, are illustrative of the present invention but are not to be regarded as limiting thereof. Run 7 illustrates how the proportions of reagents which are added may be reduced by raising the temperature. Runs 8 and 9 illustrate the use of benzol, which may be added if desired, in addition to the chlorinating and dehydrochlorinating reagents.

It is apparent from the above that optimum results may be obtained by using on the order of 20 to 50 parts of carbon tetrachloride and from 30 to 75 parts of pyridine per 100 parts by weight of the ethyl benzol.

According to the present invention a mixture containing more than 45% of styrene can be obtained directly from the cracking tube. This is obviously an advantage since styrene solutions must be concentrated to at least around 45% concentration before being polymerized. Furthermore, ethyl benzol-styrene mixtures which contain much less than 45% styrene cannot be readily concentrated due to the small spread between the boiling points of styrene and ethyl benzol.

The new method provides for increasing the concentration of the styrene, suitable for polymerization, allows of a wider range of temperatures for satisfactory cracking and without substantially decomposing the residual alkyl-benzol. Compared to the usual chlorination process which is carried out in acid proof kettles the new process offers the advantages:

(a) Of combining both chlorination and dehydrochlorination in one operation.

(b) Of greatly increasing the efficiency by largely eliminating side reactions.

(c) Of reducing the requirements for acid proof equipment to a minimum.

Further, compared to usual cracking operation, it results (d) in an improvement of approximately 50% in both "productivity" and "efficiency" largely by reducing formation of gas, carbon and tar.

(e) The percentage of styrol in the products of cracking is increased—thus simplifying purification and reducing loss of styrol during purification and polymerization.

(f) Lower temperatures are used.

It is understood that numerous minor changes may be made in the process without departing from the spirit of the invention, and it is intended that the patent shall cover, by suitable expressions in the appended claims, whatever features of patentable novelty reside in the invention.

Having thus described my invention, what I claim and desire to protect by Letters Patent is:

1. In a process of producing styrene from ethyl benzol by a cracking operation in a heated tube, the step of passing through the heated tube a mixture of ethyl benzol with a substantial proportion of a poly-halogen aliphatic hydrocarbon and an organic base capable of forming a hydrohalide.

2. In a process of producing a styrene from an alkyl-substituted benzol by a cracking operation in a heated tube, the step of passing through the heated cracking tube a mixture of the substituted benzol with a substantial proportion of a poly-chloro aliphatic hydrocarbon and an aromatic base capable of forming a hydrochloride.

3. In a process of producing styrene from ethyl benzol by a cracking operation in a heated tube, the step of passing a mixture of ethyl benzol with a substantial proportion of carbon tetrachloride and pyridine, through the heated cracking tube.

4. In a process of producing styrene from ethyl benzol by a cracking operation in a heated tube, the step of passing a mixture of ethyl benzol with a substantial proportion of carbon tetrachloride and diethylamine, through the heated cracking tube.

5. In a process of producing styrene from ethyl benzol by a cracking operation in a heated tube, the step of passing a mixture of ethyl benzol with a substantial proportion of ethylene chloride and pyridine, through the heated cracking tube.

OMAR H. SMITH.